Jan. 10, 1933.   E. G. SULLIVAN   1,893,850
APPARATUS FOR PRODUCING SOLID CARBON DIOXIDE
Filed Feb. 17, 1931   4 Sheets-Sheet 4

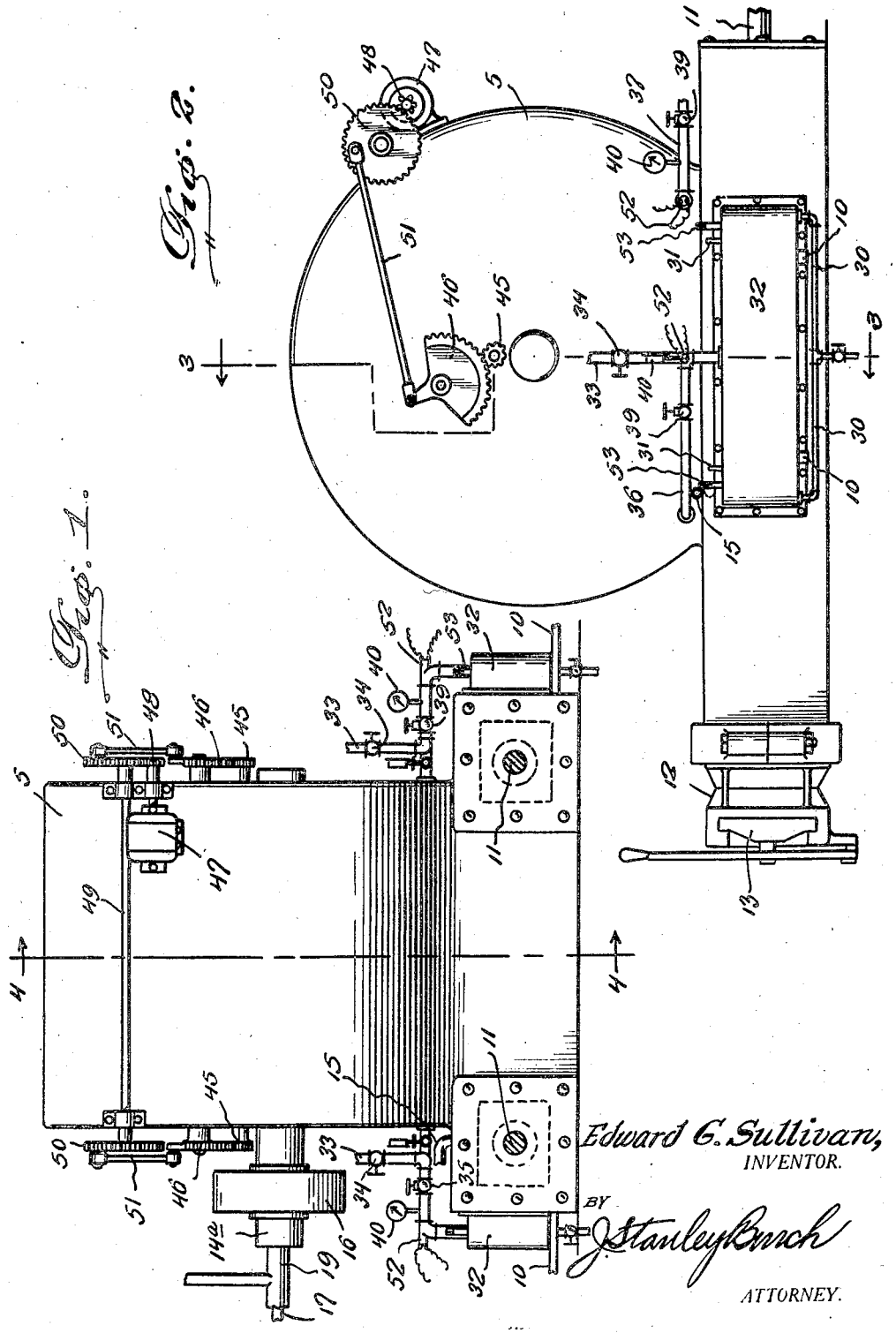

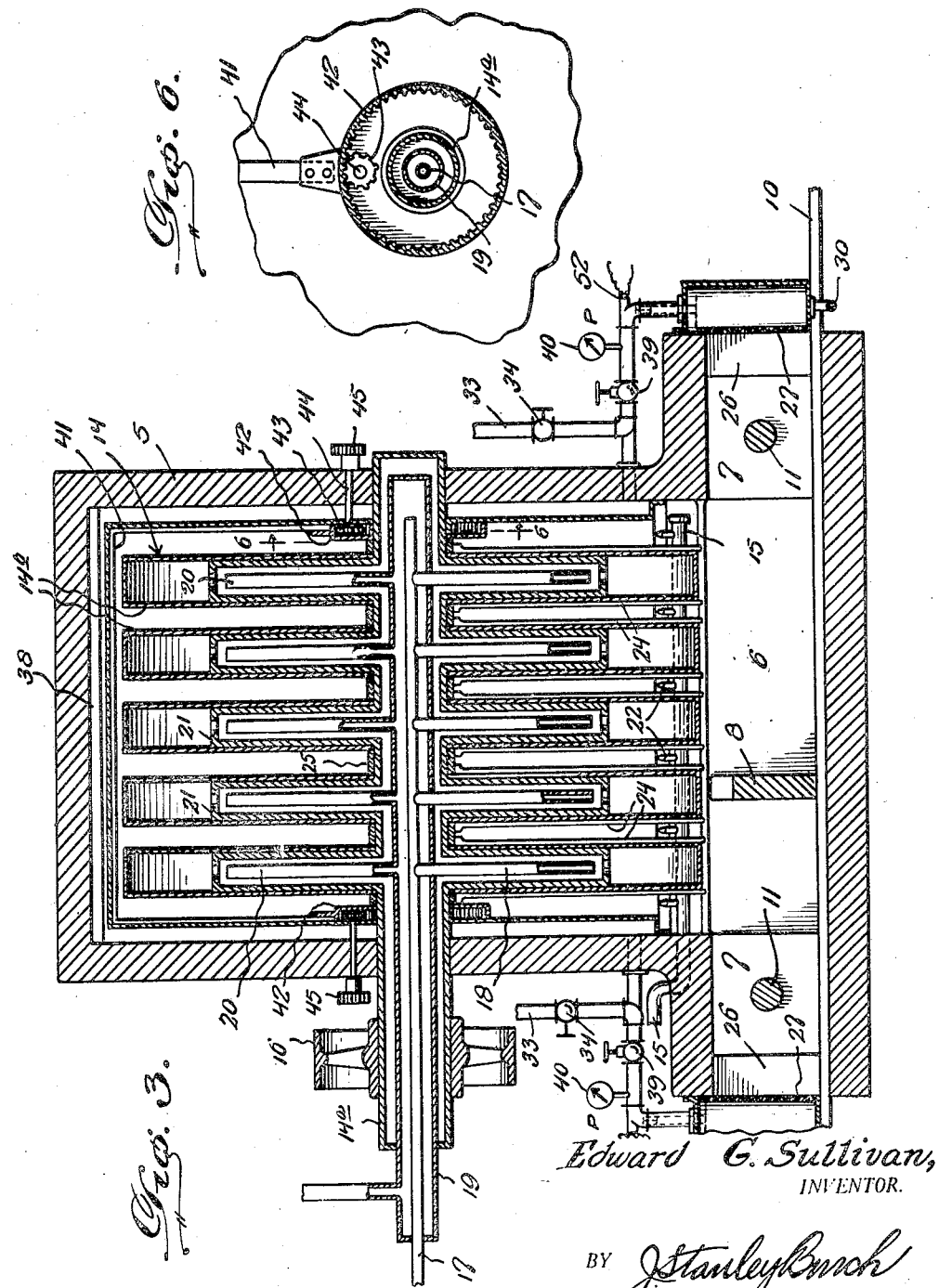

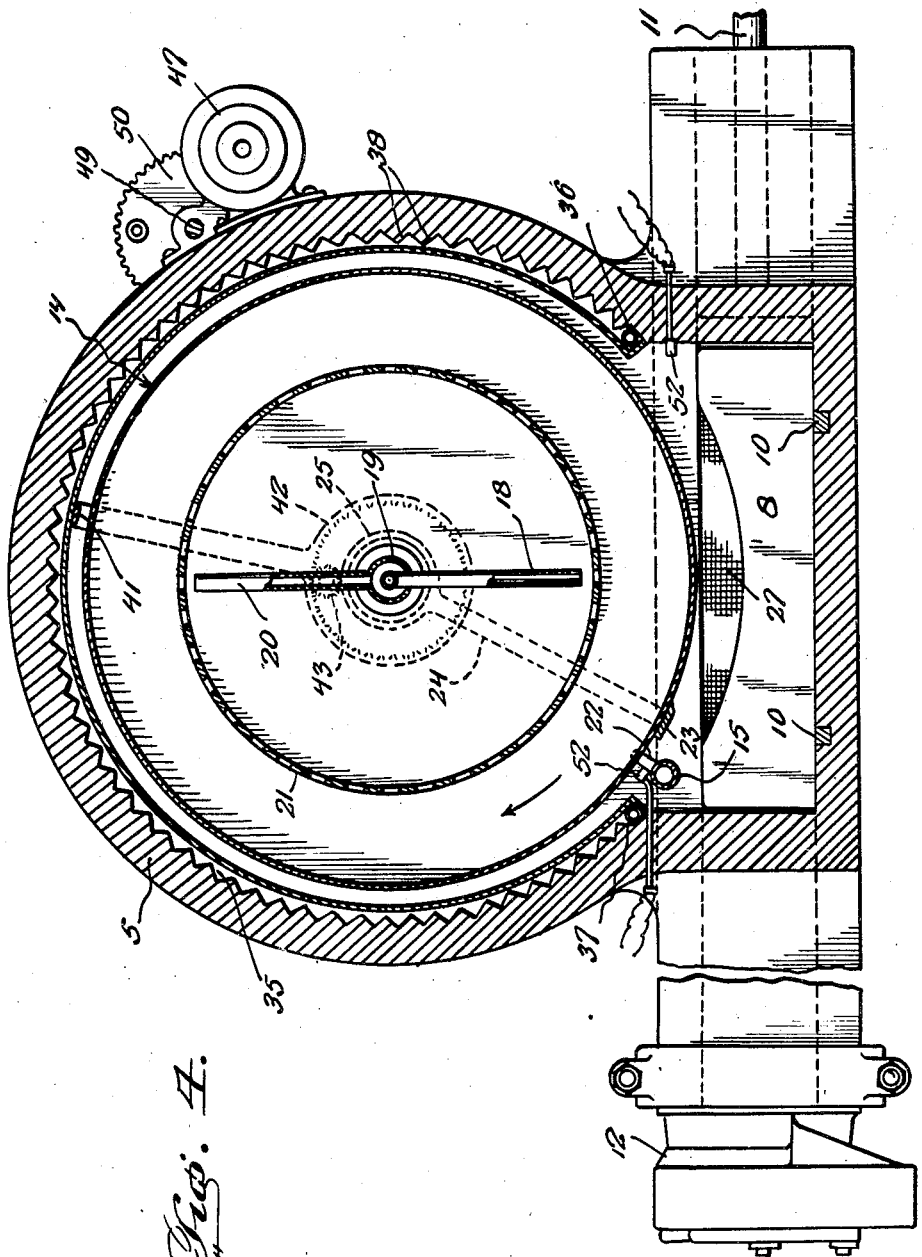

Edward G. Sullivan,
INVENTOR.

BY J. Stanley Burch
ATTORNEY.

Patented Jan. 10, 1933

1,893,850

UNITED STATES PATENT OFFICE

EDWARD G. SULLIVAN, OF AMARILLO, TEXAS, ASSIGNOR TO JOSEPH S. BELT, OF AMARILLO, TEXAS

APPARATUS FOR PRODUCING SOLID CARBON DIOXIDE

Application filed February 17, 1931. Serial No. 516,469.

The present invention relates to quantity production of solid carbon dioxide, such as is now commonly used for refrigeration purposes.

More specifically, the present invention relates to new and improved apparatus for quantity production of solid carbon dioxide from flue gases occasioned by the burning of natural gas, and wherein the separation and solidification of the carbon dioxide contained in the flue gases is wholly effected mechanically and by direct pressure.

The present invention contemplates certain novel features whereby a comparatively large percentage of the carbon dioxide may be transformed to snow and thereby separated from the nitrogen or remaining gaseous constituents of the flue gases.

A specific object of the invention is to provide an improved apparatus of the above kind embodying means for producing carbon dioxide snow, means for collecting the snow thus produced, and means for compacting the collected snow into block form for commercial use, the several said means being so related and combined and of such character as to insure efficient and continuous operation.

The above and other objects and features of my invention will be more evident from the following description when taken in connection with the accompanying drawings, in which:

Figure 1 is a rear elevational view of an apparatus constructed in accordance with the present invention.

Figure 2 is a side elevational view thereof.

Figure 3 is a vertical transverse section taken substantially upon line 3—3 of Figure 2.

Figure 4 is a substantially central longitudinal section taken on line 4—4 of Figure 1.

Figure 6 is a fragmentary detail section on line 6—6 of Figure 3.

Figure 5:
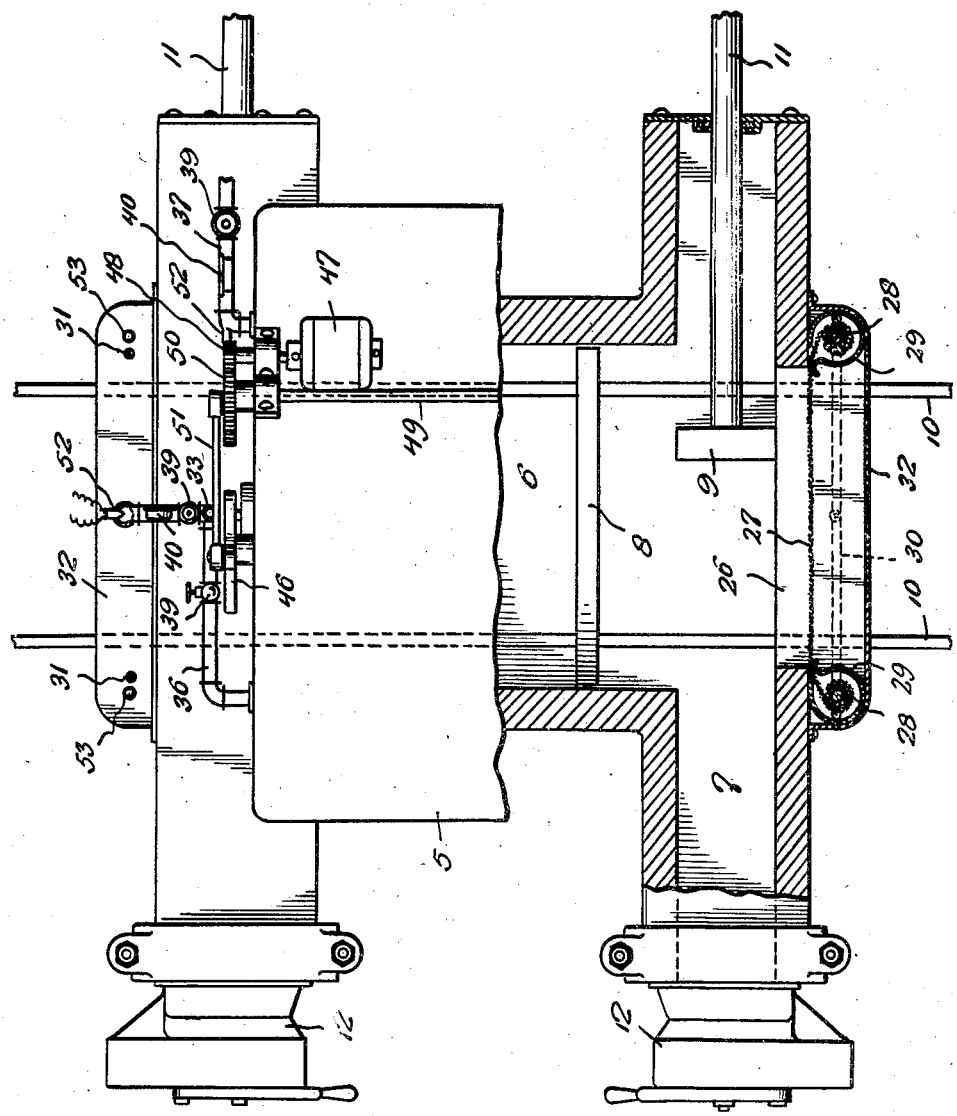
Figure 5 is an enlarged plan view of the apparatus partly broken away and in horizontal section.

The present invention contemplates the production of solid carbon dioxide from flue gases occasioned by the burning of natural gas in the presence of air, and containing approximately 10% carbon dioxide and 90% nitrogen. Before being supplied to the present apparatus, the flue gases are suitably dried, compressed and cooled, the pressure and temperature being such, however, as to effect no liquefaction of the carbon dioxide or other constituents of the flue gases. In other words, the present apparatus effects a separation of the carbon dioxide from the nitrogen by direct solidification or without any intermediate step of liquefaction of the carbon dioxide.

As shown in the drawings, the present apparatus includes a segmento-cylindrical converting chamber 5 into which the flue gases are adapted to be expanded for direct solidification of the carbon dioxide gas contained therein. The converting chamber 5 is carried upon a base including a central collecting chamber 6 which communicates through the open top thereof directly with the converting chamber 5 through the open bottom portion of the latter, thereby permitting the snow from the converting chamber to readily fall into and collect within the chamber 6. The base further involves a press chamber 7 disposed at each side of the collecting chamber 6 and directly communicating with the latter intermediate the ends of the press chambers as seen clearly in Figures 3 and 5. Slidably fitted in the collecting chamber 6 for movement transversely of the apparatus is a pusher or feed plate 8 by means of which the snow may be intermittently fed from the collecting chamber 6 to the respective press chambers 7. Operating in the press chambers 7 are suitable plungers or pistons 9 by means of which the snow fed in front of said plungers is compacted in the forward ends of the press chambers to be subsequently ejected and cut into block form for commercial use. Operating rods 10 are provided for the pusher plate 8, while the plungers 9 have piston rods 11. Suitable mechanism may be associated with the rods 10 and 11 for effecting proper timed actuation of the pusher plate 8 and plungers or pistons 9. As this mechanism forms no specific part of the present invention, it is not shown or described in detail herein. Suitable contracted nozzles of the desired shape are attached to the forward outlet ends of the press chambers 7 as at 12, so that the desired size and contour may be given to the compressed snow as it is ejected from the press chambers. These nozzles are preferably detachable so that any desired form of nozzle may be supplied, according to needs. As shown, each nozzle is provided with a manually operable shut-off or gate 13 whereby the discharge ends of the press chambers may be initially closed until a quantity of the snow has been compressed in the forward portions of the press chambers. After this has been accomplished, the compressed body of snow in the forward end of each press chamber will act as a plug against which the snow may be subsequently compacted, and as the packing of the snow proceeds, this body of compressed snow will be ejected through the nozzle 12 for being severed into block form.

Within the converting chamber 5 is a rotary refrigerating member 14 adapted to be maintained at a temperature below the solidification point of the carbon dioxide gas contained in the flue gases supplied to the converting chamber 5 by means of a pipe 15. This rotary refrigerating member consists generally of a tubular shaft 14a mounted in bearings in the end walls of the converting chamber 5 and having a plurality of intercommunicating hollow disks 14b thereon. A projecting end of the shaft 14a is shown as provided with a pulley 16 by means of which the refrigerating member 14 may be operated or rotated from a suitable source of power. A circulation of refrigerating medium may be maintained through the refrigerating member 14 by suitable means including a supply pipe 17 extending into the shaft 14a and provided with depending open ended branches 18 which extend into the lower portions of the several disks 14b as shown in Figure 3. The circulating means also includes a further pipe 19 which enters the shaft 14a in surrounding relation to the pipe 17 and has upwardly projecting branches 20 which open within the upper portions of the disks 14b, it being understood that the shaft 14a freely revolves about the pipe 19 which constitutes the outlet for the refrigerating medium. Ethylene gas is preferably used as the refrigerating medium for the refrigerating member 14. The ethylene gas is conducted through a suitable compressor and subjected to its critical pressure and condensed, after which it is conducted through pipe 17 and its branches 18 into the lower portions of the disks 14b. The flow of liquid ethylene into the disks 14b is so regulated as to maintain a desired quantity of the liquid ethylene in the lower portions of the disks 14b. As the liquid ethylene boils within the disks 14b, it evaporates back to a gas and thus produces and exerts a low temperature upon the member 14. The evaporated liquid ethylene which is ethylene gas, exhausts from the disks 14b through the branches 20 and pipe 19. Refrigerating units of this general character are old and well known, and it is deemed necessary to show only such details thereof as are involved in adaptation of the same to the present apparatus. As shown, the disks 14b are preferably of laminated reinforced construction including a perforated annular reinforcing wall 21 intermediate the periphery and axis of each disk. This adapts the disk to effectively withstand the extremely low temperatures which maintain within the converting chamber without damage from contraction and expansion. As shown, the supply pipe 15 for the flue gases is provided with a number of expansion nozzles 22 which project upwardly toward the axis of the member 14 between adjacent ones of the disks 14b and between the end disks and the end walls of the converting chamber 5. The pipe 15 is preferably located at the bottom of the converting chamber and forwardly of the axis of the member 14 as seen clearly in Figure 4. As the flue gases discharge from the nozzles 22 into the converting chamber 5, they expand and lower considerably in temperature so that the major portion of the carbon dioxide gas in the flue gases is converted directly to a solid. In practice, the carbon dioxide impinges the walls of the disks 14b and adheres thereto in the form of a snow, to a great extent. Due to the low temperature of the surfaces of the disks 14b, the solidification of the carbon dioxide is enhanced and a very great percentage of the carbon dioxide is solidified. This action is further enhanced by cooling the inner walls of the converting chamber 5 in a manner which will be later described.

A bar 23 is rigidly mounted in the lower portion of the converting chamber 5 with portions thereof arranged to engage the peripheries of the disks 14b so as to scrape the accumulated snow therefrom as the member 14 is rotated. Further scraper bars 24 are supported from the shaft 14a between the disks 14b as well as at the outer sides of the end disks, so as to scrape the accumulated snow from the side surfaces of all of the disks as the member 14 is rotated. These scraper bars 24 are suspended by means of rings loosely encircling the shaft 14a as at 25, and the lower ends of the scraper bars 24 are rigidly attached to the scraper bar 23 so as to be held stationary. It is thus apparent that the adhering snow will be effectively scraped from all surfaces of the disks 14b when the member 14 is rotated, the freed snow falling through the bottom of the converting chamber 5 and accumulating within the collecting chamber 6.

Openings 26 are provided in the outer sides of the press chambers 7 intermediate the ends of the latter for the escape of nitrogen and any carbon dioxide gas which may not solidify, and extended across these openings so as to permit the escape of the gas but to prevent escape of any of the snow are screens 27. Rollers 28 are preferably journaled vertically at opposite sides of each opening 26, and each screen is preferably in the form of a web having its ends attached to the opposed rollers of each pair and adapted to be selectively wound from one roller to the other and vice versa. The purpose of this arrangement is to enable a new length of screen to be brought in position across the respective openings from time to time as the previously used portion of the screen becomes partly clogged with snow. Means is also provided for melting the snow on the used portion of the screen after it is wound upon either roller so that a portion of the screen is always available which is free from being clogged. For this purpose, each roller 28 is preferably mounted within a housing 29, and adjacent ones of these housings are provided with supply pipes 30 extending from a source of heating medium, such as a source of hot air supply. The housings 29 are also provided with top outlets 31 so that the hot air may be fed to the housings by the pipes 30 and allowed to exhaust to the atmosphere through the outlets 31. In this way, it is evident that the snow may be melted from the screen when rolled within either housing 29, and when this snow melts it returns to gaseous form and escapes with the heating medium through the outlets 31. The shafts of the rollers 28 may project above the top of the housings 29 and be provided with polygonal projecting ends so that a crank or handle may be attached to either shaft for winding the screen 27 upon either one of the associated pair of rollers. When the screen has been rolled entirely from one roller onto the other, it may be wound in the reverse direction, and so on. A casing 32 is provided outside each opening 26 and the adjacent housings 29, thereby forming within each casing 32 a gas outlet chamber. Each casing 32 is provided with a top outlet pipe 33 provided with a control valve 34 and adapted to extend to any suitable point for discharging into the atmosphere.

The converting chamber 5 is of double-walled construction so as to provide between the walls thereof a cooling chamber 35 both at the periphery and sides of the converting chamber. The gas outlet pipe 33 has a branch 36 communicating with the chamber 35 so as to supply the escaping gases to said chamber 35. Another pipe leads from the opposite side of the converting chamber 5 near the bottom of the latter as at 37 to provide for the exhaust or escape of the gases from the chamber 35 after exerting its cooling influence upon the inner walls of the converting chamber 5. In order to cause the gas to constantly impinge against the inner walls of the chamber 5, the outer walls thereof are provided with numerous transverse ribs 38 of V-shape as shown in Figure 4. Obviously, these ribs will cause the circulating gas to be continuously thrown inwardly against the inner walls of the converting chamber 5 as it passes from the supply pipe 36 to the outlet pipe 37. It will thus be seen that efficient means is provided for supercooling the walls of the converting chamber 5 by means of the nitrogen and unsolidified carbon dioxide gas which escapes from the apparatus by way of openings 26, casings 32 and outlet pipes 33. The pipes 33, 36 and 37 have suitable control valves 39 and pressure gages 40 so that the escaping gas may be properly regulated and allowed to flow respectively to the cooling chamber 35 and to the atmosphere. At the same time, this arrangement permits maintaining a back pressure upon the gas within the converting chamber 5 and prevents too rapid or free escape of the gases from said converting chamber.

It will be noted that a certain amount of snow will form and adhere to the inner walls of the converting chamber in addition to the walls of the rotating refrigerating member 14. Means is therefore provided for continuously freeing the snow from the walls of the converting chamber, such means including a scraper blade 41 of U-shape arranged to engage the peripheral and side walls of the converting chamber. The scraper blade 41 is adapted to be continuously oscillated back and forth, and for this purpose is carried at its ends by means of internal gears 42 journaled upon the shaft 14a at the sides of the chamber 5, each internal gear 42 having a pinion 43 meshing therewith, and each pinion 43 being associated with means for giving the same a reciprocating rotary motion. As shown, the pinions 43 are mounted upon shafts 44 journaled in the side or end walls of the chamber 5 and having further pinions 45 fixed upon the outer projecting ends thereof, a segment gear 46 being pivoted upon each side of the converting chamber 5 in mesh with the adjacent pinion 45. A motor is mounted at the rear of the chamber 5 as at 47, and through suitable gearing 48 this motor imparts continuous rotation in one direction to a transverse shaft 49 journaled upon the converting chamber 5. Crank members 50 are secured upon the ends of the shaft 49 and respectively connected to the segment gear 46 at the adjacent side of the machine by means of a connecting rod 51. In this way continuous rotation of the crank elements 50 impart a reciprocating motion to the connecting rods 51 whereby the segment gears 46 are rocked back and forth. This imparts the desired rotary reciprocating motion to the pinions 45 and 46 so that the scraper blade 41 is oscillated back and forth to the desired extent. The snow freed from the inner walls of the chamber 5 by means of the scraper 41 will fall with the snow freed from the rotary refrigerating member 14 through the bottom of the converting chamber 5 into the collecting chamber 6.

In operation, flue gases which have been previously dried and compressed, as well as preliminarily cooled, are supplied under pressure through the nozzles 22 into the converting chamber 5. As the flue gases escape from the nozzles 22 they expand and lower in temperature, so that after continued operation the temperature within the converting chamber 5 will be lower than the critical temperature of the carbon dioxide gas in the flue gases for the pressure which maintains. As the carbon dioxide is converted directly to a solid, some of it will fall through the bottom of the converting chamber into the collecting chamber 6. Much of the snow which is formed will also adhere to the sides of the converting chamber 5 and disks 14b as well as to the peripheries of said chamber 5 and disks 14b. As the rotary refrigerating member 14 revolves, the snow is scraped from the disks by means of the scrapers 23 and 24, the freed snow falling through the bottom of the converting chamber into the collecting chamber 6. To this is added the snow which forms upon the sides and periphery of the converting chamber 5 and which is freed from the latter by means of the scraper blade 41 as the latter is oscillated back and forth in the manner hereinbefore set forth. The formation of snow upon the disks 14b is expedited by maintaining the latter at an extremely cold temperature, the latter being accomplished by circulating ethylene through the disks as has also been previously set forth.

After the chamber 5 fills with gas, the nitrogen and unsolidified carbon dioxide gas will escape through the openings 26 so as to pass into the casings 32 and then by way of pipes 33 to the cooling chamber 35 and to the atmosphere. The cold escaping gases are thus utilized in the cooling chamber 35 for cooling the inner walls of the converting chamber 5 to facilitate the formation of snow on said walls. At necessary intervals, the screens 27 are adjusted so as to always keep a clean portion of the screen opposite each opening 26 whereby proper escape of the unsolidified gases is insured. As the snow accumulates in the collecting chamber 6, the pusher plate 8 is shifted so as to feed the snow at proper intervals to the press chambers 7, after which the plungers 9 are reciprocated for compressing the snow ahead of the same and within the forward end portions of the press chambers 7. After a compressed body of snow is had within the forward ends of the chambers 7, the gates 13 are opened and, upon continued operation, the compressed body of snow is expressed through the open end of each nozzle 12 for being severed into block form for commercial use. Suitable thermo-couples 52 may be employed adjacent the nozzles 22, within the lower portion of the converting chamber 5, and at other suitable points for facilitating maintenance of proper temperatures at these places whereby maximum efficiency of operation is insured. The projecting ends of the shafts for the rollers 28, whereby the latter may be conveniently rotated, are indicated at 53. The mixed gases supplied to pipe 15 consist substantially of 90% nitrogen and 10% carbon dioxide, and this mixture is subjected to a pressure of from 2900 pounds per square inch to 3500 pounds per square inch, and is cooled to a temperature of from $-62°$ C. to $-70°$ C. When this mixture under these conditions is expanded to 150 pounds pressure, the temperature of the mixture drops to $-104°$ C., causing the carbon dioxide to separate in a solid state. In all cases, substantially nine-tenths of the carbon dioxide separates in the form of a solid, and no liquid is produced at any time under these conditions.

From the foregoing description it is believed that the construction and operation, as well as the objects and features of the present invention, will be readily understood and appreciated by those skilled in the art. It is particularly pointed out that the specific construction of the apparatus as disclosed herein is merely illustrated by way of example, it being obvious that various changes and substitutions of equivalents may be readily made without departing from the spirit and scope of the invention as claimed.

What I claim as new is:

1. In an apparatus for producing solid carbon dioxide, a converting chamber having a bottom collecting chamber, a press chamber arranged at each side of the collecting chamber and communicating through the side thereof directly with said collecting chamber, and means to feed the snow laterally from the collecting chamber into the respective press chambers.

2. In an apparatus for producing solid carbon dioxide, a segmento-cylindrical converting chamber, a horizontal rotary refrigerating member therein, means cooperating with said refrigerating member for removing snow therefrom, means to remove snow from the inner surface of said converting chamber, and a collecting chamber beneath the converting chamber for receiving the snow as it is removed from the refrigerating member and the converting chamber.

3. In an apparatus for producing solid carbon dioxide, a converting chamber, a rotary refrigerating member therein, means cooperating with said refrigerating member for removing snow therefrom, a collecting chamber beneath the converting chamber for receiving the snow as it is removed from the refrigerating member, said rotary refrigerating member including a plurality of intercommunicating hollow disks adapted to have a refrigerating medium circulated therethrough, and means to discharge the gas to be solidified into the converting chamber between the disks.

4. Apparatus for producing solid carbon dioxide, having a gas escape opening, a screen associated with said opening to permit the escape of gas and to prevent the passage of snow therethrough, said screen being movable across said opening whereby clean portions thereof may be presented in registry with the opening at will, and means operable for moving said screen.

5. Apparatus for producing solid carbon dioxide, having a gas escape opening, a screen associated with said opening to permit the escape of gas and to prevent the passage of snow therethrough, said screen being movable across said opening whereby clean portions thereof may be presented in registry with the opening at will, means operable for moving said screen, and means for melting the snow which may adhere to the used portions of the screen after being moved out of registry with said opening.

6. In an apparatus for producing solid carbon dioxide, a segmento-cylindrical converting chamber having a bottom collecting chamber, a U-shaped scraper mounted for oscillating movement to scrape snow from the side and peripheral walls of the converting chamber, and means to oscillate said scraper.

7. In an apparatus for producing solid carbon dioxide, a segmento-cylindrical converting chamber having a bottom collecting chamber, a U-shaped scraper mounted for oscillating movement to scrape snow from the side and peripheral walls of the converting chamber, means to oscillate said scraper, a rotary refrigerating member within said converting chamber and embodying a plurality of intercommunicating hollow disks adapted to to have a refrigerating medium circulated therethrough, and means to scrape snow from the side and peripheral surfaces of said disks as the refrigerating member is rotated.

8. In an apparatus for producing solid carbon dioxide, a converting chamber, means to cool the walls of said converting chamber, means to remove snow from said walls of the converting chamber, said converting chamber having a bottom collecting chamber for the snow, press chambers at opposite sides of said collecting chamber and communicating with the latter intermediate their ends, and means to feed the snow from the collecting chamber to said press chambers.

9. In an apparatus for producing solid carbon dioxide, a converting chamber, means to cool the walls of said converting chamber, means to remove snow from said walls of the converting chamber, said converting chamber having a bottom collecting chamber for the snow, press chambers at opposite sides of said collecting chamber and communicating with the latter intermediate their ends, means to feed the snow from the collecting chamber to said press chambers, said press chambers having gas escape openings in the outer sides thereof, screens over said openings to permit the escape of gas and to prevent the escape of snow.

10. In an apparatus for producing solid carbon dioxide, a converting chamber, means to cool the walls of said converting chamber, means to remove snow from said walls of the converting chamber, said converting chamber having a bottom collecting chamber for the snow, press chambers at opposite sides of said collecting chamber and communicating with the latter intermediate their ends, means to feed the snow from the collecting chamber to said press chambers, said press chambers having gas escape openings in the outer sides thereof, screens over said openings to permit the escape of gas and to prevent the escape of snow, said screens being movable across said openings to present new portions of the same in registry therewith, and means operable to move said screens at will.

11. In an apparatus for producing solid carbon dioxide, a converting chamber, said converting chamber being of double-walled construction to provide a cooling chamber within the wall thereof, the outer walls of said converting chamber having internal transverse ribs, and means for circulating a cooling gas through the cooling chamber transversely of the ribs whereby the latter act to repeatedly direct the gas inwardly against the inner wall of said converting chamber.

In testimony whereof I affix my signature.

EDWARD G. SULLIVAN.